US005611512A

United States Patent [19]

Cholet

[11] Patent Number: 5,611,512

[45] Date of Patent: Mar. 18, 1997

[54] DEVICE FOR FIXING AN ELECTRONIC DISPLAY HOUSING

[75] Inventor: Claude Cholet, La Frette-Sur-Seine, France

[73] Assignee: Sitour Electronic Systems (S.E.S), France

[21] Appl. No.: 387,902

[22] PCT Filed: Jun. 10, 1994

[86] PCT No.: PCT/FR94/00688

§ 371 Date: Feb. 9, 1995

§ 102(e) Date: Feb. 9, 1995

[87] PCT Pub. No.: WO94/29832

PCT Pub. Date: Dec. 22, 1994

[51] Int. Cl.[6] .................................................... F16M 13/00

[52] U.S. Cl. ............................... 248/220.22; 248/222.12; 248/298.1

[58] Field of Search ............................. 248/220.22, 27.3, 248/222.11, 222.12, 309.1, 316.8, 298.1; 40/653, 649, 652, 657, 658, 491, 448

[56] References Cited

U.S. PATENT DOCUMENTS

| | | | |
|---|---|---|---|
| 3,034,756 | 5/1962 | Ka Dell | 248/222.12 |
| 3,610,425 | 10/1971 | Madey | 248/220.22 |
| 4,067,529 | 1/1978 | Milcoy | 248/222.12 |
| 4,179,138 | 12/1979 | Bogdanovic | 248/222.12 X |
| 4,357,768 | 11/1982 | De Dube . | |
| 4,466,592 | 8/1984 | Janson | 248/220.22 |
| 4,909,464 | 3/1990 | Levine et al. | 248/220.22 |
| 4,939,861 | 7/1990 | Soubliere . | |
| 5,452,874 | 9/1995 | Kozloff et al. | 248/222.11 |

FOREIGN PATENT DOCUMENTS

| | | |
|---|---|---|
| 0486460 | 10/1991 | European Pat. Off. . |
| 2658645 | 2/1990 | France . |
| 2249854 | 10/1990 | United Kingdom . |

*Primary Examiner*—Karen J. Chotkowski
*Attorney, Agent, or Firm*—Blakely Sokoloff Taylor & Zafman

[57] ABSTRACT

A device for fixing a housing of an electronics module includes an intermediate part (6) on which the housing (1) is fixed, and also includes a rail (5*a*) for receiving the housing (1) and the intermediate part (6), said intermediate part (6) including a locking element (21) that carries a catch (30) suitable for co-operating with complementary relief on the intermediate part (6) to hold the locking element in a retracted position, from which it is released when the intermediate part (6) and the housing (1) are put into place on the rail (5*a*).

9 Claims, 3 Drawing Sheets

DEVICE FOR FIXING AN ELECTRONIC DISPLAY HOUSING

Figure 1:
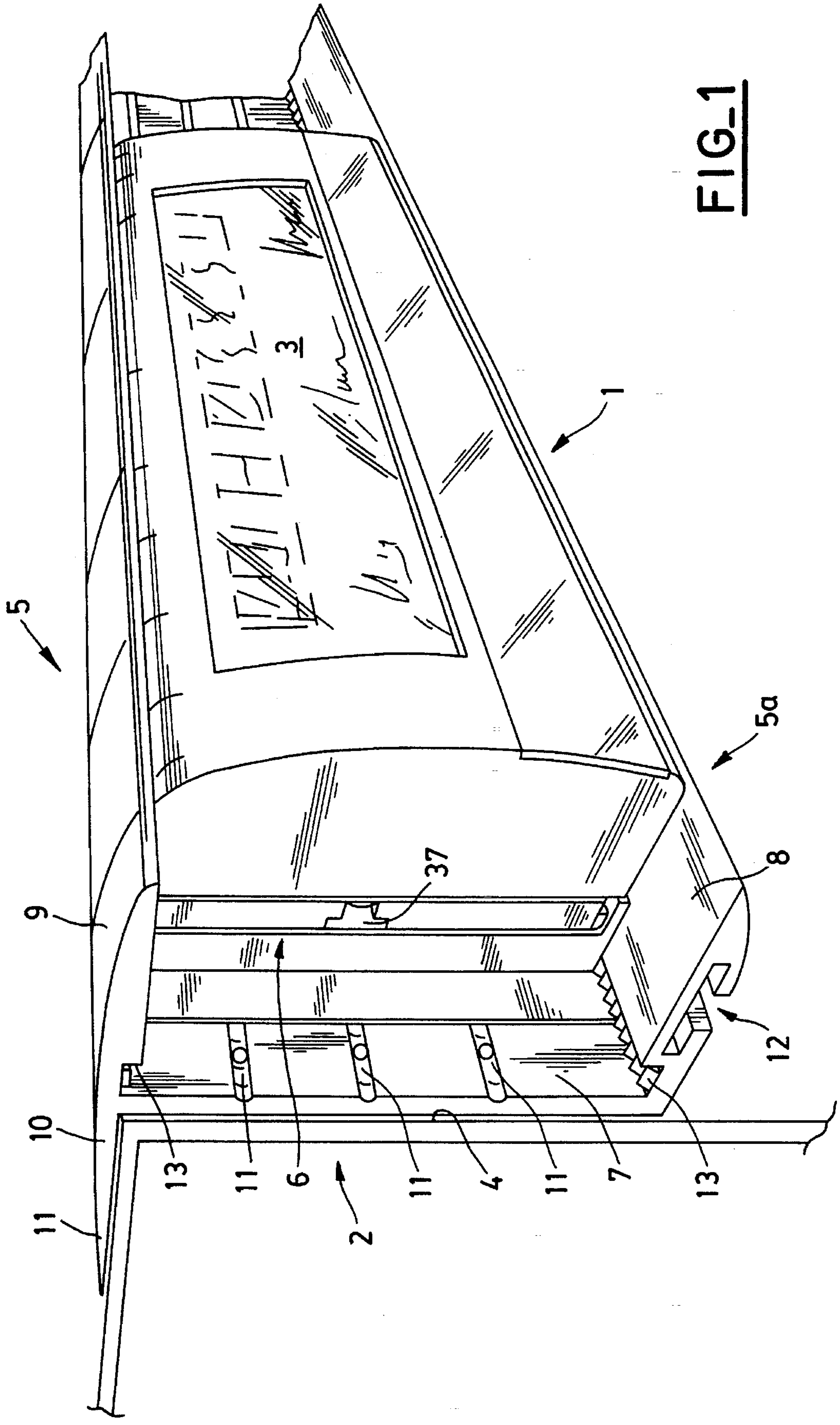

The present invention relates to a device for fixing electronic modules or housings for displaying information such as prices or the like in retail shops or on any other site, e.g. storage areas or production factories.

The Applicant has recently proposed, in particular in French patent application FR-2 658 645, an installation including a plurality of display modules that constitute remotely-controlled electronic labels.

The installation serves to replace conventional card labels with display modules having liquid crystal screens and receiving display instructions from a control unit which centralizes all of the information relating to the various goods displayed in a single shop.

An important advantage of such an installation lies in making it possible to avoid the lengthy handling required for fully updating the prices of various articles on display in a shop, such as a supermarket.

The display modules are designed to be installed on the edges of the shelving on which the articles are placed. At present, the housings of the modules are fixed by means comprising rails running along the shelves and including slideways that engage in complementary grooves on said housings. The housings are shifted manually along the rails until they are in position relative to the articles with which they correspond.

Such fixing means are nevertheless not very satisfactory.

To install the housings, it is necessary for them to be entered one after anther in the exact order they are to appear along the shelving, starting from one end of the rail that carries them.

In addition, if one of the display modules needs to be changed, then all of the housings carried by the rail on one side or the other of the housing of the module that needs to be changed must themselves be disengaged from the rail.

A main aim of the invention is thus to propose a fixing device that enables this problem to be solved.

Document GB-2 249 854 already discloses a device for fixing at least one electronic module housing for displaying information relating to goods exposed in a shop, and in particular in a retail shop, the device comprising a rail designed to receive the housing and an intermediate part which carries at least one resilient locking member having at least one projection designed to co-operate with a groove presented by the rail for the purposing of holding said housing relative to said rail, the housing and said intermediate part presenting complementary means for fixing said housing on said intermediate part.

The different variants described in that document are not easy to handle. In particular, mounting the intermediate part on the rail requires the operator to perform relatively accurate movements at the rail, which is awkward.

Mounting operations also turn out to be lengthy.

Also, the housing is not held very securely.

An object of the invention is to mitigate these drawbacks.

According to the invention, the solution consists in particular in that the locking element has a catch designed to co-operate with a complementary projection on the intermediate part to hold said locking element in a retracted position against resilient urging thereof, the projection then being disengaged relative to the groove of the rail with which it co-operates, the intermediate part having a resilient branch which, while the housing and the intermediate part are being installed on the rail, is urged back by the web of said rail coming into contact with the catch, so as to disengage the catch from the complementary projection with which it co-operates, the locking element then resiliently urging the projection into the groove of the rail.

Thus, to fix the housing on the rail, the operator needs only to cock the locking element, and then exert a simple thrust force on the housing once it has been presented on the rail together with its intermediate part.

The fixing device proposed by the invention also has the advantage of being adaptable to shelving of different dimensions, and in particular shelves of different thicknesses.

Figure 2:
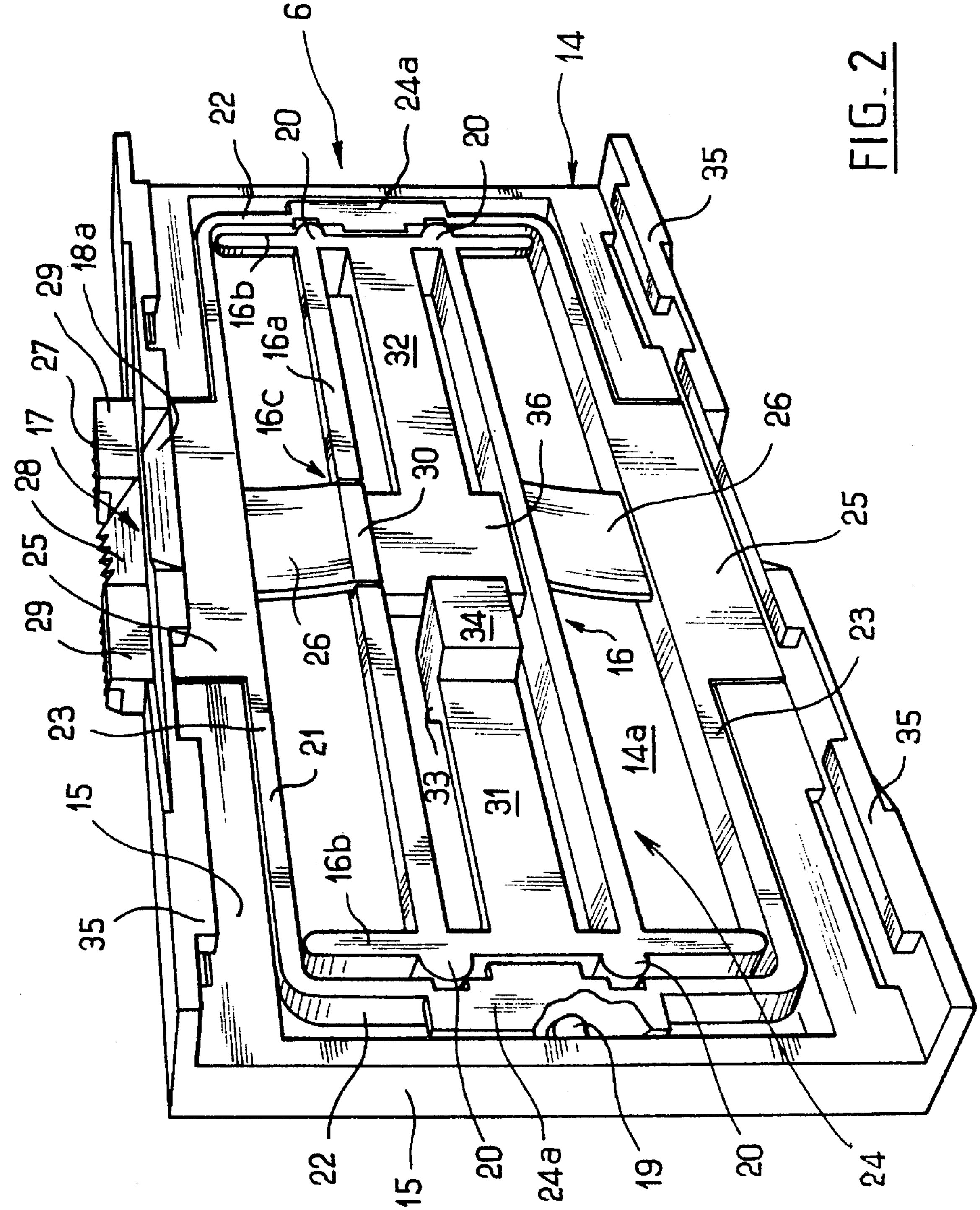
Figure 3:
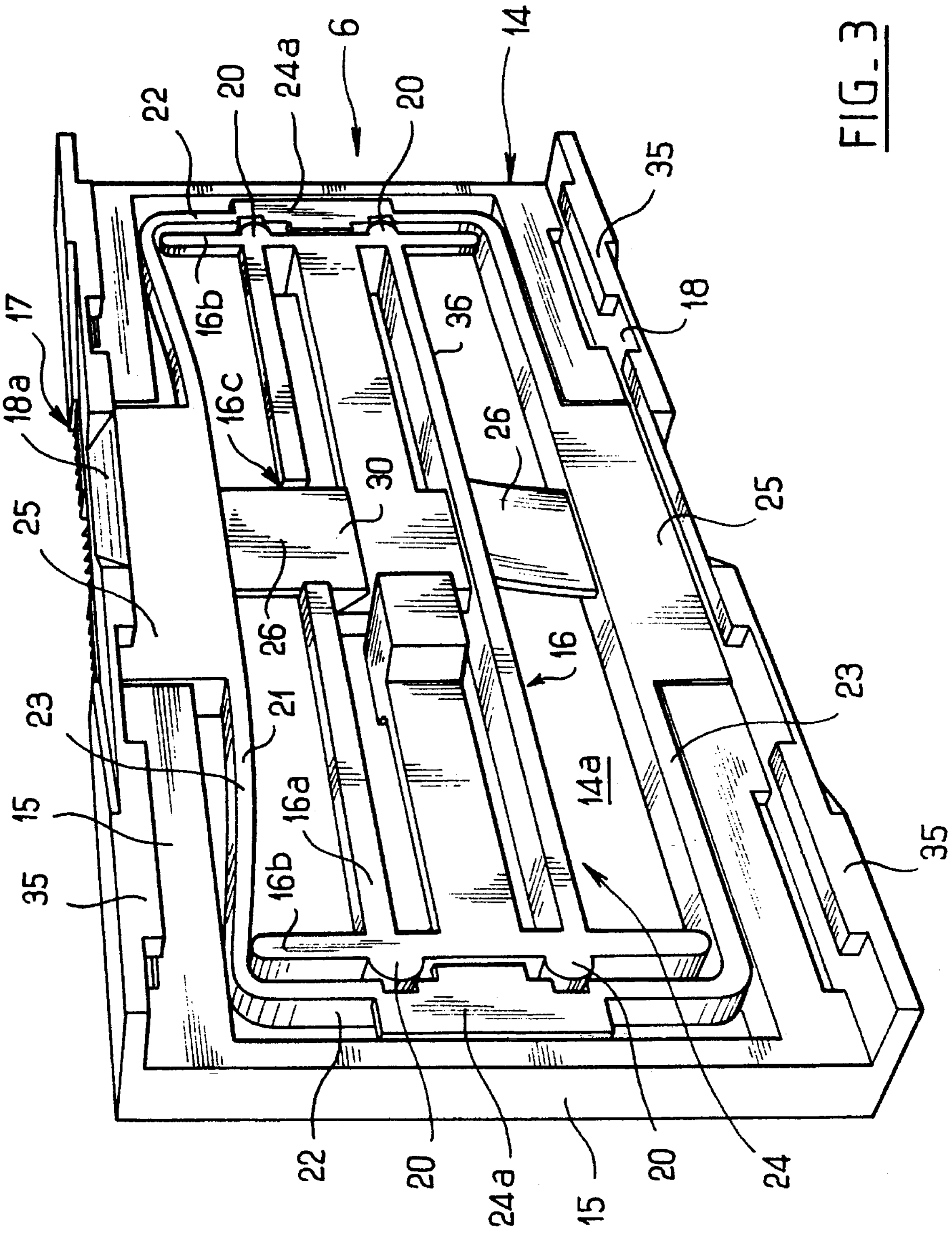

Other characteristics and advantages of the invention appear further from the following description of a particular embodiment thereof. The description is to be read with reference to the accompanying drawings, in which:

FIG. 1 is a perspective view of a device of the invention for fixing the housing of an electronic display module; and FIG. 2 and FIG. 3 are perspective views of the intermediate part for locking the FIG. 1 fixing device, said intermediate part being shown respectively in its locking state and in its non-locking state.

The device shown in FIG. 1 enables a housing 1 of a display module that forms an electronic label to be fixed on a shelf 2. The module has a screen 3 which, when the housing 1 is fixed on the shelf 2, is parallel to the edge 4 of the shelf 2 and is visible to a consumer passing between the shelves.

The display module forms a portion of an installation of the type described in above-specified French patent application FR-2 658 645.

The fixing device mainly comprises a holding bar 5 and an intermediate part 6 between the bar 5 and the housing 1.

The holding bar 5 is a part comprising a sill 10 for supporting the bar 5 on a shelf and a generally channel-section reception rail **5*a*. The rail 5*a* has a web 7 with two longitudinally-extending flanges 8 and 9 referred to throughout below as the bottom flange 8 and the top flange 9, with reference to their respective positions when the bar 5 is in place on the shelf 2. The sill 10 runs along said rail 5*a* and projects perpendicularly from the web 7 in the opposite direction to the top flange 9**.

The holding bar 5 is designed to be mounted on the shelf 2 in such a manner that the sill 10 and the web 7 bear respectively against the top face of the shelf 2 and against its edge 4. The bar 5 is fixed to the shelf 2 by rivets. The faces of the sill 10 and of the web 7 opposite to their faces bearing against the shelf have longitudinal grooves 11 designed to receive and to hide the heads of the rivets (not shown).

The bottom flange 8 is conventionally provided with a flat T-section slot 12 which opens out in the face of the flange 8 that faces away from the top flange 9. The slot 12 thus forms a slideway that faces downwards when the bar 5 is in place and that is suitable for carrying, for example, folded PVC material for supporting publicity elements (of the type commonly called [in French] "STOP-RAYON").

The rail **5*a* also has two serrated longitudinal inside grooves referenced 13, one being in the bottom flange 8 and the other in the top flange 9. The two serrated grooves 13** extend facing each other along the entire length of the rail *5a,* and they are situated immediately adjacent to the web 7.

Reference is now made more particularly to FIGS. 2 and 3.

The intermediate part 6 shown therein is constituted by a plate 14 and by a resilient locking element 21 that is described in greater detail below. The outline of the plate 14 is rectangular. It comprises a back sheet **14*a* with outer and inner patterns 15 and 16 projecting therefrom, between which the element 21 is engaged. The outside width of the plate 14 is slightly shorter than the distance between the facing faces of the flanges 8 and 9. The length of the plate is substantially equal to the length of the housing 1**.

The outer pattern 15 constitutes a frame around the major portion of the outline of the plate 14. It is interrupted along each of the long sides of the plate 14 by respective openings 17 centered in the corresponding sides and occupying substantially one-third of the sides (which fraction is, naturally, given solely as an indication and could be different). On either side of the opening 17, the pattern 15 is reinforced and in particular its thickness extending along the long sides of the frame 14 is greater than its thickness along the short sides thereof. The portions of the outer pattern 15 that extend along the long sides of the plate 14 carry respective rims 18 that extend along each of said sides, projecting perpendicularly to the back sheet 14*a* of the plate 14. Each of the two rims 18 carries ribs 35 projecting towards the inside of the frame, and designed to engage in corresponding grooves presented by the housing 1, for the purpose of holding said housing 1 relative to the intermediate element 6.

The inner pattern 16 comprises a rib 16*a* forming an elongate rectangular outline whose long sides are parallel to the long sides of the plate 14, said rib 16*a* being centered on the center of the plate 14. The widths of the rectangular rib 16*a* are extended at each end of the lengths of said rib by ribs 16*b* that come to respective ends facing the reinforced portions of the outer pattern 15. The gap between the outer pattern 15 and each such rib 16*b* is the same for all four ribs 16*b*. Four rounded projections 20 project from the short sides of the rectangular rib 16*a*, extending the long sides of said rib 16*a* beyond said short sides. One of the long sides of the rectangular rib 16*a* is interrupted in its middle portion by an opening 16*c*.

The back sheet of the plate 14 also carries two studs 19 (FIG. 2) that do not project so far as the patterns 15 and 16. These two studs 19 are disposed at respective ends of the longitudinal midline of the plate 14 and they are disposed adjacent to portions of the pattern 15 that extend along the short sides of the plate 14. The gap between each of the studs 19 and the rectangular rib 16*a* is substantially identical to the gap between the ribs 16*b* and the pattern 15.

The resilient locking element 21 has two uprights 22 interconnecting two longitudinal cross-members 23. The uprights 22 and the cross-members 23 together define a frame 24 which fits between the patterns 15 and 16 and which is held by friction relative thereto. In particular, when the element 21 is in place on the plate 14, the ends of the ribs 16*b* engage the inside walls of the corners of the frame 24, while the walls defining the outside corners of the frame 24 come into contact with the greater thickness reinforced portions of the outer pattern 15. The uprights 22 are then in contact via their inside walls with the rounded projections 20.

Each upright 22 carries a lug-forming flat 24*a* that projects from the upright towards the outside of the frame. Each of the lugs 24*a* bears on the end of a stud 19 when the element 21 is in place on the plate 14.

Each longitudinal cross-member 23 carries a tab 25 and a tongue 26, each of which is flat and parallel to the midplane of the frame 24. Each tab 25 extends from the cross-member 23 that carries it towards the outside of the frame 24. Each tongue 26 extends from the corresponding cross-member 23 towards the inside of the frame 24. Such tabs 25 and tongues 26 are centered relative to the lengths of the cross-members 23 that carry them.

The tabs 25 occupy one-third of the length of the cross-members 23 that carry them. On their edges furthest from the supporting cross-members 23, the tabs carry serrations 27 that are designed to co-operate with the serrations of the grooves 13, in a manner described in greater detail below. In a central portion of each tab 25, the serrations are defined by a sloping surface 28 that runs from the tips of the serrations 27 towards the cross-member 23 carrying the tab 25, and from one of the faces of the tab 25 towards its other face. The serrations 27 on either side of the sloping surface 28 are closed at one end by a flat wall 29 that extends the face of the tab 25 that is opposite to the side of the tab 25 at which the tips of the serrations on the sloping surface 28 are located. The rim 18 that is closest to the opening 16*c* also has a sloping surface 18*a* which is designed to extend the surface 28 of the tab 25 cooperating with said rim 18 when the longitudinal cross-member 23 carrying the tab 25 is not subjected to bending.

The tongue 26 carried by the longitudinal cross-member 23 that is furthest from the opening 16*c* is a spacer that bears against the rectangular rib 16*a*. It prevents this longitudinal cross-member 23 from bending.

The other tongue 26 is terminated by a catch 30 that faces the back sheet 14*a* and that is designed to cooperate with the edge of the opening 16*c*.

The outline that is defined on the back sheet 14*a* by the rectangular rib 16*a* is open. The end portions of the rectangular rib 16*a* carry respective flat resilient branches referenced 31 and 32 that overlie the resulting opening. Both branches extend parallel to the long sides of the plate 14, from respective ends of the rib 16*a* to substantially the center thereof. The end of the branch 31 that is furthest from the end carrying it is terminated by two head portions 33 and 34 that project from said branch, respectively from the side thereof that is designed to overlie the web 7 and from the side thereof that is designed to face the back of the housing 1. The head portion 34 projects farther than the head portion 33.

The back of the housing 1 has a recess (not shown) designed to receive the head portion 34, and also a sloping groove 37 (FIG. 1) deigned to guide the head portion 34 into said recess.

The branch 32 is terminated by a slab 36 which projects a little relative to the face of the back sheet 14*a* that is designed to face the web 7 and that is disposed exactly in the same zone as that occupied by the catch 30 when the tongue 26 terminated by said catch 30 is pushed through the opening 16*c*.

Implementation of the fixing device is descried below.

Initially, the operator lays the holding bar 5 on the shelf 2 and fixes the bar to the shelf, e.g. by riveting the web 7 and the sill 10 to the edge 4 and to the top face of the shelf 2 which are pre-drilled for this purpose. The rivets are uniformly distributed along the length of the shelf 2 and they are disposed so that their heads are to be found in the grooves 11.

As will have been observed, the bar 5 can be mounted on shelves of different sizes, and in particular on shelves of different thicknesses.

The resilient locking element 21 is installed on the plate 14 as follows: the frame 24 is presented to the plate 14 at a slight angle so as to engage one of its tabs 25 in the opening 18 that is the closer to the length of the rectangular rib 16*a* that does not have an opening. Thereafter, the frame 24 is tilted back between the outer and inner patterns 15 and 16 causing the cross-member 23 carrying the outer tab 25 to bend so as to insert the other tab into the corresponding opening 18 (FIG. 2).

The housing 1 is then slid along the intermediate element 6 between the rims 18 so that the ribs 35 engage in the complementary grooves presented by the housing 1. The groove 37 guides the head portion 34 to the recess presented in the housing for receiving it.

Thereafter, the operator presses against the tab 25 that faces the opening 16*c* so as to push back the tongue 26 carrying the catch 30 until the catch engages on the edge of the back sheet 14*a* (FIG. 3). The cross-member 23 carrying said tongue is then subjected to resilient bending. The tab 25 and its serrations 27 are retracted relative to the long side of the plate 14.

The operator then inserts the assembly constituted by the intermediate part 6 and the housing 1 mounted thereon into the rail 5*a* by tilting the assembly so that initially it is the serrations of the non-retracted tab 25 that are presented to the serrations in the bottom serrated groove 13 of the holding bar 5.

Once the serrations 27 on said tab 25 have meshed with the serrations in the bottom serrated groove 13, the operator causes the assembly constituted by the intermediate part 6 and the housing 1 to pivot relative to the midline of contact between said serrations 27 and the bottom serrated groove 13 so as to move the back sheet 14*b* towards the web 7 of the bar 5.

When the back sheet 14*b* comes into abutment against the web 7, the slab 36 of the resilient branch 32 is urged towards the back of the housing 1. As it moves, the slab 36 also pushes against the catch 30. The longitudinal cross-member 23 carrying the tongue 26 which is terminated by said catch 30 returns resiliently to its rest position. The serrated tab 25 carried thereby is pushed through the opening 17 and engages in the top serrated groove 13.

Simultaneously, the head portion 33 of the tongue 31 is pushed back by coming into contact with the web 7 in such a manner that the head portion 34 is forced into the recess presented by the housing 1. The housing 1 is thus locked relative to the intermediate part 6.

To disengage the housing 1 and the intermediate part 6 from the rail of the holding bar 5, the operator has a tool which enables a blade to be inserted between the serrations of the top tab 25 and the serrations in the top groove 13 in the holding bar. The wall 29 and the sloping surface 28 serve to guide the blade all the way to the tips of the serrations 27 of the tab 25. By applying pressure to the tips of the serrations 27, the operator can disengage the top serrations from the holding bar 5. It is then possible to withdraw the assembly constituted by the intermediate part 6 and the housing 1 from the rail 5*a*. The head portion 34 is no longer locked in the corresponding recess in the back of the housing 1. The operator can then slide the housing 1 out of the intermediate part 6.

The various parts of the device as described above are made by molding, e.g. out of PVC.

In a variant, the bottoms of one or both of the two grooves 13 can be made of a material that is more flexible (rubber, flexible PVC, or some other substance) than the remainder of the bar 5, and in which the serrations 27 penetrate for meshing purposes. Such a bar 5 is obtained by using coextrusion methods known to the person skilled in the art. This more flexible material may be deposited on the teeth or it may replace them. It may fill the groove, it may be laminated, or it may be serrated.

The bar 5, the intermediate part 6, and the housing may be personalized by special colors, by varying the colors of the substances from which those three elements are made, or indeed by plating a colored strip on the web of the rail 5*a*.

Also in a variant, the teeth of the housing that are designed to engage in the grooves of the rail may be inverted compared with the configuration shown in the drawings.

Also in a variant, the teeth of the rail may be made separately.

They may also be replaced by any other element designed to be received in the groove(s) of the rail, which elements may be made by extrusion or by injection. Such an element may be fixed in the groove of the rail by various means, and in particular by adhesive, snap-fastening, or by mechanical co-operation implementing means of the dove-tail type.

The teeth of the rail may be replaced by a foam, a rubber, or any other fastening substance that performs the function of securing the intermediate part.

The teeth of the intermediate part may themselves be replaced by any other securing means. In particular, they may be made at the top, or at the bottom, or at both top and bottom, out of a plastics material that is different from that of the remainder of the intermediate part. This use of two kinds of plastic can be achieved by adding on an extra part.

Likewise, it will be observed that the grooves in the web of the rail could have any other disposition, and in particular they could be situated, for example, between the top and bottom sides of the rail, or they could be situated at the front of the rail.

The holding bar may have various different shapes. In the example described, the shape of the bar enables it to be fitted to a shelf having a vertical edge. Its shape could be different for shelves made of basket wire or of glass (e.g. a glass sheet).

The bar may be fixed to its support by means other than riveting, and in particular it may be fixed thereto by adhesive or by adhesive strips.

I claim:

1. A device for fixing at least one electronic module housing (1) for displaying information relating to goods exposed in a shop, and in particular in a retail shop, the device comprising a rail (5*a*) designed to receive the housing (1) and an intermediate part (6) which carries at least one resilient locking member (21) having at least one projection designed to co-operate with a groove presented by the rail (5) for the purposing of holding said housing (1) relative to said rail (5*a*), the housing (1) and said intermediate part (6) presenting complementary means (35) for fixing said housing (1) on said intermediate part (6), the device being characterized in that the locking element (21) has a catch (30) designed to co-operate with a complementary projection on the intermediate part (6) to hold said locking element (21) in a retracted position against resilient urging thereof, the complementary projection (25) then being disengaged relative to the groove (13) of the rail with which it co-operates, the intermediate part (6) having a resilient branch (32) which, while the housing (1) and the intermediate part (6) are being installed on the rail (5*a*), is urged back by the web (7) of said rail coming into contact with the catch (30), so as to disengage the catch from the complementary projection with which it cooperates, the locking element (21) then resiliently urging the projection into the groove of the rail (5*a*).

2. A device according to claim 1, characterized in that the rail (5*a*) has a web (7) and two longitudinally-extending flanges (8, 9) on either side of the web (7), together with two inside grooves (13) carried by respective ones of the flanges (8, 9) and extending along the web (7) in the immediate vicinity thereof.

3. A device according to claims 1 or 2, characterized in that the intermediate part (6) carries a resilient branch (32) terminated by a head portion (34), the back of the housing (1) having a recess designed to receive said head portion (34), said branch (32) being urged during installation of the housing (1) and the intermediate part (6) on the rail **(5*a*) by coming into contact with the web (7) of said rail, thereby causing said head portion (34) to engage in said recess so as to lock the housing (1) relative to said intermediate part (6)**.

4. A device according to any preceding claim, characterized in that at least one projection (25) has serrations (27) designed to co-operate with complementary means carried by the groove (13) which co-operates with at least one said projection (25), for the purpose of securing the housing (1) longitudinally relative to the rail **(5*a*)**.

5. A device according to claim 4, characterized in that the serrations (27) are distributed along the entire length of at least one of the grooves (13) in the rail.

6. A device according to claim 4, characterized in that the bottom of at least one of the grooves in the rail is made of a material in which the serrations of the at least one serrated projection are designed to penetrate for engagement purposes.

7. A device according to claim 2 characterized in that the bottom flange (8) of the rail **(5*a*) has a flat slot (12) open to the face of said flange (8) facing away from the top flange (9)** and designed to receive and carry publicity supports.

8. A device according to claim 2 for fixing the housing (1) on shelving (2), characterized in that the rail **(5*a*) is a portion of section bar (5) also having a sill (10) that extends substantially at right angles to the web (7) of the rail (5*a*) being designed to bear against a top face and an edge of a shelf (4)**, respectively.

9. A device according to claim 8, characterized in that the rail **(5*a*) and the sill (10) are fixed to the shelf (2) by riveting, and have longitudinal grooves (11)** for receiving the heads of the rivets.

* * * * *

UNITED STATES PATENT AND TRADEMARK OFFICE

CERTIFICATE OF CORRECTION

PATENT NO. : 5,611,512
DATED : March 18, 1997
INVENTOR(S) : Cholet

It is certified that error appears in the above-indentified patent and that said Letters Patent is hereby corrected as shown below:

In the title page, please insert item --

[30] Foreign Application Priority Data
June 11, 1993 [FR] France....................................93/07097 --.

Signed and Sealed this

Fifth Day of August, 1997

Attest:

BRUCE LEHMAN

*Attesting Officer* *Commissioner of Patents and Trademarks*